US012791386B2

(12) United States Patent
Tissera et al.

(10) Patent No.: US 12,791,386 B2
(45) Date of Patent: Nov. 10, 2026

(54) HYPERSPECTRAL DATA AND IMAGE ANALYSIS USING MACHINE LEARNING

(71) Applicant: MLVX Technologies Inc., Vancouver (CA)

(72) Inventors: Migel Dileepa Tissera, Coquitlam (CA); Francis George Doumet, Vancouver (CA); Parisa Asgharzadeh, Coquitlam (CA); Ahmed Sigiuk, Burnaby (CA)

(73) Assignee: MLVX Technologies Inc., Vancouver (CA)

(*) Notice: Subject to any disclaimer, the term of this patent is extended or adjusted under 35 U.S.C. 154(b) by 450 days.

(21) Appl. No.: 18/394,146

(22) Filed: Dec. 22, 2023

(65) Prior Publication Data

US 2024/0288308 A1 Aug. 29, 2024

Related U.S. Application Data

(63) Continuation of application No. PCT/CA2023/051676, filed on Dec. 15, 2023, and a (Continued)

(51) Int. Cl.
*G01J 3/28* (2006.01)
*G06V 10/143* (2022.01)
(Continued)

(52) U.S. Cl.
CPC ............... *G01J 3/2823* (2013.01); *G01J 3/28* (2013.01); *G06V 10/143* (2022.01); *G06V 10/58* (2022.01);
(Continued)

(58) Field of Classification Search
USPC .......................................................... 702/189
See application file for complete search history.

(56) References Cited

U.S. PATENT DOCUMENTS 6,075,891 A * 6/2000 Burman ................. G06V 20/13 382/190
8,897,571 B1 11/2014 Robinson et al.
(Continued)

FOREIGN PATENT DOCUMENTS

CN 115439679 12/2022
KR 10-2483521 A1 1/2023
(Continued)

OTHER PUBLICATIONS

Liu, Zongbin et al. Intelligent identification of film on cotton based on hyperspectral imaging and convolutional neural network. Science Progress, 2022, vol. 105(4) 1-21, DOI: 10.1177/00368504221137461.
(Continued)

*Primary Examiner* — Paul D Lee
(74) *Attorney, Agent, or Firm* — D'Ambrosio & Menon, PLLC; Usha Menon

(57) ABSTRACT

A method of processing hyperspectral data includes receiving the hyperspectral data. The hyperspectral data includes spectral data for each pixel in a two-dimensional array of pixels, and for each spectral band in a set of multiple spectral bands associated with each pixel. The hyperspectral data is converted into one-dimensional spectra. Each one-dimensional spectrum includes, for a single pixel of the pixels, the spectral data for each spectral band in the set of multiple spectral bands associated with the single pixel. Each one-dimensional spectrum is inputted to a trained transformer neural network. For each one-dimensional spectrum, the trained transformer neural network is used to spectrally un-mix the spectral data in the set of multiple spectral bands.

17 Claims, 9 Drawing Sheets

Related U.S. Application Data continuation-in-part of application No. 18/175,264, filed on Feb. 27, 2023, now Pat. No. 12,602,925.

(51) Int. Cl.

| | |
|---|---|
| ***G06V 10/58*** | (2022.01) |
| ***G06V 10/764*** | (2022.01) |
| ***G06V 10/82*** | (2022.01) |
| ***H04N 23/11*** | (2023.01) |
| ***H04N 23/56*** | (2023.01) |
| ***H04N 23/74*** | (2023.01) |

(52) U.S. Cl.

CPC ............ *G06V 10/764* (2022.01); *G06V 10/82* (2022.01); *H04N 23/11* (2023.01); *H04N 23/56* (2023.01); *H04N 23/74* (2023.01); *G01J 2003/2826* (2013.01); *G01J 2003/2833* (2013.01)

(56) References Cited

U.S. PATENT DOCUMENTS

| | | | | |
|---|---|---|---|---|
| 11,253,151 | B2 | 2/2022 | Zhang | |
| 11,333,553 | B2 | 5/2022 | Wissmann et al. | |
| 11,386,582 | B1 | 7/2022 | Tissera | |
| 2008/0088840 | A1* | 4/2008 | Bodkin | G01J 3/021 356/326 |
| 2015/0142461 | A1 | 5/2015 | Darty | |
| 2016/0150213 | A1* | 5/2016 | Mutti | G06T 7/62 348/143 |
| 2020/0264098 | A1 | 8/2020 | Huang | |
| 2021/0285867 | A1 | 9/2021 | Dumler et al. | |
| 2021/0383151 | A1 | 12/2021 | Germain | |
| 2022/0138481 | A1 | 5/2022 | Deshpande et al. | |
| 2022/0221342 | A1* | 7/2022 | Kim | G01J 3/2823 |
| 2022/0268751 | A1 | 8/2022 | Farkas et al. | |
| 2023/0023641 | A1 | 1/2023 | Rosenfeld et al. | |
| 2023/0027514 | A1 | 1/2023 | Ma et al. | |
| 2023/0419660 | A1 | 12/2023 | Uljanovs et al. | |
| 2024/0130646 | A1 | 4/2024 | Thomas et al. | |
| 2025/0274643 | A1* | 8/2025 | Benny | G01J 3/2823 |

FOREIGN PATENT DOCUMENTS

| | | | |
|---|---|---|---|
| WO | 2021209872 | | 10/2021 |
| WO | WO2021209872 | A1 | 10/2021 |
| WO | 2021/255458 | A1 | 12/2021 |
| WO | 2021245374 | A1 | 12/2021 |

OTHER PUBLICATIONS

Huang et al. Deep Networks with Stochastic Depth. arXiv:1603.09382, Jul. 28, 2016.

Kalra. Attention Networks: A simple way to understand Self Attention. Webpage < https://medium.com/@geetkal67/attention-networks-a-simple-way-to-understand-self-attention-f5fb363c736d>, 21 pages, Jun. 5, 2022. Retrieved on Dec. 6, 2023.

Scheibenreif et al. Masked Vision Transformers for Hyperspectral Image Classification. Proceedings of the IEEE/CVF Conference on Computer Vision and Pattern Recognition (CVPR) Workshops, 2023, pp. 2166-2176.

International Search Report and Written Opinion of PCT International Application No. PCT/CA2023/051676, dated Mar. 15, 2024.

Licciardi, G. A. et al., "Pixel Unmixing in Hyperspectral Data by Means of Neural Networks" IEEE Transactions on Geoscience and Remote Sensing, vol. 49, Issue: 11, pp. 4163-4172, Aug. 1, 2011, retrieved from https://ieeexplore.ieee.org/document/5967899.

Ghosh, P. et al., "Deep Hyperspectral Unmixing using Transformer Network", arXiv.org, v1, pp. 1-13, Mar. 31, 2022, retrieved from https://arxiv.org/abs/2203.17076.

Hu, X. et al. "A Lightweight 1-D Convolution Augmented Transformer with Metric Learning for Hyperspectral Image Classification" Sensors 2021, 21(5), 1751, pp. 1-20, Mar. 3, 2021, retrieved from https://www.mdpi.com/1424-8220/21/5/1751.

Deng, Y-J. et al. "Robust Patch Tensor-based Multigraph Embedding for Dimensionality Reduction of Hyperspectral Images", IGARSS 2022—2022 IEEE International Geogscience and Remote Sensing Symposium, Kuala Lumpur, Malaysia, pp. 1149-1152, Jul. 22, 2022, retrieved from https://ieeexplore.ieee.org/document/9883148.

Wan, L., et al. "Hyperspectral Unmixing Based on Spectral and Sparse Deep Convolutional Neural Networks", IEEE Journal of Selected Topics in Applied Earth Observations and Remote Sensing, vol. 14, pp. 11669-11682, Nov. 9, 2021, retrieved from https://ieeexplore.ieee.org/document/9609631.

Ahmed, A.M. et al., "Hybrid Spectral Unmixing: Using Artificial Neural Networks for Linear / Non-Linear Switching", Remote Sens. 2017, 9(8), 775, pp. 1-22, Jul. 29, 2017, retrieved from https://www.mdpi.com/2072-4292/9/8/775.

Bera, S. et al., "Advances in Hyperspectral Image Classification Based on Convolutional Neural Networks: A Review", Computer Modeling in Engineering & Sciences, vol. 133, No. 2, pp. 1-30, Jul. 21, 2022, retrieved from https://www.techscience.com/CMES/v133n2/48965.

International Search Report and Written Opinion of PCT International Application No. PCT/CA2023/051374, dated Jan. 8, 2024.

Wang et al., "Single-Pixel Hyperspectral Imaging via an Untrained Convolutional Neural Network", Key Laboratory of Optoelectronic Devices and Detection Technology, School of Physics, Liaoning University, Shenyang 110036, China (Year: 2023).

* cited by examiner

84

700

HYPERSPECTRAL DATA AND IMAGE ANALYSIS USING MACHINE LEARNING

FIELD

The present disclosure relates to hyperspectral data and image analysis, and in particular to methods and systems for performing hyperspectral data analysis and hyperspectral image analysis of materials with the aid of machine learning.

BACKGROUND

Hyperspectral data is a rich source of information used in a variety of fields, including medical diagnostics, remote sensing, and material analysis. Hyperspectral imaging (HSI) is a technology that, for each pixel, captures data contained in hundreds of narrow wavelength bands across a specific range of the electromagnetic spectrum. For instance, a HSI camera capturing data in the visible-to-near-infrared (VNIR) range may collect spectral data relating to over 200 different frequency bands in the 400-1000 nm range, producing a large amount of high-fidelity information generally in the form of a 3D data cube.

Various platforms, such as airplanes, drones, satellites, rotary scanners, and conveyor belts, may be used to capture such data. Airborne and spaceborne HSI systems are used for a variety of remote sensing applications, including precision agriculture, search and rescue, ecosystem monitoring, and mineral exploration. In industrial environments, they are used for contaminant detection in the food and pharmaceutical industries, material identification, and automated sorting. Although less common, field-deployable HSI systems are used in mineral exploration and national security tasks.

In the context of material analysis, hyperspectral imaging is a tool used for identifying the material composition of objects. Different materials absorb and reflect light differently, producing a "reflective fingerprint" or "spectral signature" which can be used to identify the material that reflected the light. Transparent materials, however, present several challenges. For example, because of the object's transparent nature, the reflected light contains not only the signature of the transparent material but also that of any underlying material (e.g. flooring or a conveyor belt), or a combination of spectral signatures of the transparent material, the underlying material, and those of other objects around it. Furthermore, the reflected light is usually extremely faint and when processed may have a low Signal-to-Noise Ratio (SNR). This combination of mixed spectral signatures (i.e. an overall spectral signature consisting of a mixture of different individual spectral signatures) and low SNR becomes a formidable challenge for existing material detection algorithms to overcome. Furthermore, hyperspectral data analysis, traditionally relying on manual feature extraction and domain-specific knowledge, faces inherent challenges in processing complex hyperspectral information.

SUMMARY

According to a first aspect of the disclosure, there is provided a method of using hyperspectral imaging to identify one or more materials in an object, comprising: illuminating the object with light (for example, full-spectrum light), wherein at least some of the light is reflected by the object; using a hyperspectral imaging sensor to capture, based on the reflected light, one or more hyperspectral images of the object, the one or more hyperspectral images comprising hyperspectral data; inputting the one or more hyperspectral images to a trained machine learning model; using the trained machine learning model to spectrally un-mix the hyperspectral data so as to extract one or more spectral signatures from the hyperspectral data; and identifying, based on the one or more extracted spectral signatures, one or more materials comprised in the object.

The object may be at least partially transparent to visible light.

The object may be a multilayered object, each layer comprising one or more materials.

The light may have at least an infrared component.

The trained machine learning model may comprise at least one trained neural network, such as a convolutional neural network (CNN), a fully-connected neural network, a transformer, or a recurrent network.

The neural network may be a CNN comprising one or more 1-dimensional convolutions.

Extracting the one or more spectral signatures from the hyperspectral data may comprise: identifying, within the hyperspectral data, one or more spectral signatures, each identified spectral signature corresponding to a respective spectral signature in a set of predefined spectral signatures associated with predefined materials; and extracting the one or more identified spectral signatures.

Inputting the one or more hyperspectral images to the trained machine learning model may comprise: compressing, using a first computer device, the one or more hyperspectral images; transmitting the compressed one or more hyperspectral images over a computer network to a second computer device; decompressing, using the second computer device, the compressed one or more hyperspectral images; and inputting decompressed one or more hyperspectral data images to the trained machine learning model.

The first computer device may comprise a Field-Programmable Gate Array (FPGA).

The second computer device may comprise an FPGA.

During the illuminating, the object may be moving relative to the hyperspectral imaging sensor.

The trained machine learning model may be a first trained machine learning model, and the method may further comprise determining, using a second trained machine learning model and based on the one or more hyperspectral images, a shape of the object.

Determining the shape of the object may comprise: obtaining visible image data of the object; inputting the visible image data to the second trained machine learning model; and using the second trained machine learning model to determine, based on the visible image data, the shape of the object.

The second trained machine learning model may comprise a neural network, such as a CNN comprising one or more 2-dimensional convolutions.

Obtaining the visible image data may comprise extracting the visible image data from the one or more hyperspectral images.

Identifying the one or more materials may comprise: identifying, for each of the one or more materials, an amount of the material relative to an amount of each other material.

Each hyperspectral image may comprise pixels. Spectrally un-mixing the hyperspectral data may comprise extracting, for each pixel, one or more spectral signatures from the hyperspectral data associated with the pixel. Identifying the one or more materials may comprise identifying, for each pixel and based on the one or more extracted spectral signatures, one or more dominant materials in a portion of the object corresponding to the pixel.

Identifying the one or more dominant materials may comprise: identifying, for at least one pixel of the pixels, multiple materials in the portion of the object corresponding to the at least one pixel; and identifying, from among the multiple materials, the one or more dominant materials.

Identifying the one or more dominant materials may comprise: applying one or more thresholds to each spectral signature associated with each of the multiple materials; and identifying the one or more dominant materials based on the application of the one or more thresholds.

Identifying the one or more dominant materials may comprise: for each of one or more other pixels of the pixels, determining at least one dominant material in a portion of the object corresponding to the other pixel; and identifying the one or more dominant materials based on each determined dominant material of each other pixel.

According to a further aspect of the disclosure, there is provided a hyperspectral imaging system comprising: a light source for emitting light; a hyperspectral imaging sensor; one or more computer processors; and a computer-readable medium storing computer program code configured, when executed by the one or more computer processors, to cause the one or more computer processors to perform a method comprising: controlling the light source to illuminate an object; receiving, from the hyperspectral imaging sensor, one or more hyperspectral images of the object captured in response to at least some of the emitted light being reflected by the object and being received at the hyperspectral imaging sensor, the one or more hyperspectral images comprising hyperspectral data; inputting the one or more hyperspectral images to a trained machine learning model; using the trained machine learning model to spectrally un-mix the hyperspectral data so as to extract one or more spectral signatures from the hyperspectral data; and identifying, based on the one or more extracted spectral signatures, one or more materials comprised in the object.

According to a further aspect of the disclosure, there is provided a computer-readable medium storing computer program code configured, when executed by a processor, to cause the processor to: receive one or more hyperspectral images of an object, the one or more hyperspectral images comprising hyperspectral data; input the one or more hyperspectral images to a trained machine learning model; use the trained machine learning model to spectrally un-mix the hyperspectral data so as to extract one or more spectral signatures from the hyperspectral data; and identify, based on the one or more extracted spectral signatures, one or more materials comprised in the object.

According to a further aspect of the disclosure, there is provided a method of processing hyperspectral data, comprising: receiving the hyperspectral data, wherein the hyperspectral data comprises spectral data for each pixel in a two-dimensional array of pixels, and for each spectral band in a set of multiple spectral bands associated with each pixel; converting the hyperspectral data into one-dimensional spectra, wherein each one-dimensional spectrum comprises, for a single pixel of the pixels, the spectral data for each spectral band in the set of multiple spectral bands associated with the single pixel; inputting each one-dimensional spectrum to a trained transformer neural network; and for each one-dimensional spectrum, using the trained transformer neural network to spectrally un-mix the spectral data in the set of multiple spectral bands.

The method may further comprise, for each one-dimensional spectrum, using the trained transformer neural network to classify, based on the unmixed spectral data, the pixel associated with the one-dimensional spectrum.

The method may further comprise identifying, based on each classified pixel, one or more materials associated with the hyperspectral data.

Spectrally un-mixing the spectral data may comprise: for each one-dimensional spectrum, using the trained transformer neural network to divide the one-dimensional spectrum into a set of patches, wherein each patch comprises spectral data for each spectral band in a subset of spectral bands of the multiple spectral bands; and spectrally un-mixing the spectral data associated with the set of patches.

The trained transformer neural network may be a trained one-dimensional vision transformer neural network configured to generate, for each patch, a patch embedding by applying a one-dimensional convolution to the patch.

The trained one-dimensional vision transformer neural network may be further configured, for each patch embedding, to embed positional data comprising data indicative of a position of the patch associated with the patch embedding relative to a position of at least one other patch associated with at least one other patch embedding.

The trained one-dimensional vision transformer neural network may be further configured, for at least one set of embedded positional data, to embed a class token.

Spectrally un-mixing the spectral data may comprise: for each patch, generating a patch embedding; inputting each patch embedding to a transformer encoder coupled to a multilayer perceptron head; and using the transformer encoder and the multilayer perceptron head to spectrally un-mix the spectral data associated with the set of patches.

Inputting each patch embedding to the transformer encoder may comprise: inputting each patch embedding to a multi-head attention layer; and for each patch embedding at the output of the multi-head attention layer, inputting the patch embedding to a multi-layer perceptron layer.

Inputting each patch embedding to the multi-head attention layer may comprise: normalizing the patch embedding; and inputting the normalized patch embedding to the multi-head attention layer.

Inputting the patch embedding to the multi-layer perceptron layer may comprise: normalizing the patch embedding; and inputting the normalized patch to the multi-layer perceptron layer.

Classifying the pixel associated with the one-dimensional spectrum may comprise: identifying, within the unmixed spectral data, one or more spectral signatures, each identified spectral signature corresponding to a respective spectral signature in a set of predefined spectral signatures associated with predefined materials; and classifying the pixel based on the one or more spectral signatures.

Classifying the pixel may comprise: identifying, based on the one or more spectral signatures, multiple materials associated with the pixel; and identifying, from among the multiple materials, one or more dominant materials.

Identifying the one or more dominant materials may comprise: applying one or more thresholds to each spectral signature associated with each of the multiple materials; and identifying the one or more dominant materials based on the application of the one or more thresholds.

Identifying the one or more dominant materials may comprise: for each of one or more other pixels of the array of pixels, determining at least one dominant material associated with the other pixel; and identifying the one or more dominant materials based on each determined dominant material of each other pixel.

According to a further aspect of the disclosure, there is provided a hyperspectral imaging system comprising: a light source for emitting light; a hyperspectral imaging sensor; one or more computer processors; and a computer-readable medium storing computer program code configured, when executed by the one or more computer processors, to cause the one or more computer processors to perform a method comprising: controlling the light source to illuminate an object; receiving, from the hyperspectral imaging sensor, one or more hyperspectral images of the object captured in response to at least some of the emitted light being reflected by the object and being received at the hyperspectral imaging sensor, the one or more hyperspectral images comprising hyperspectral data, wherein the hyperspectral data comprises spectral data for each pixel in a two-dimensional array of pixels, and for each spectral band in a set of multiple spectral bands associated with each pixel; converting the hyperspectral data into one-dimensional spectra, wherein each one-dimensional spectrum comprises, for a single pixel of the pixels, the spectral data for each spectral band in the set of multiple spectral bands associated with the single pixel; inputting each one-dimensional spectrum to a trained transformer neural network; and for each one-dimensional spectrum, using the trained transformer neural network to spectrally un-mix the spectral data in the set of multiple spectral bands.

According to a further aspect of the disclosure, there is provided a computer-readable medium storing computer program code configured, when executed by a processor, to cause the processor to: receive hyperspectral data, wherein the hyperspectral data comprises spectral data for each pixel in a two-dimensional array of pixels, and for each spectral band in a set of multiple spectral bands associated with each pixel; convert the hyperspectral data into one-dimensional spectra, wherein each one-dimensional spectrum comprises, for a single pixel of the pixels, the spectral data for each spectral band in the set of multiple spectral bands associated with the single pixel; input each one-dimensional spectrum to a trained transformer neural network; and for each one-dimensional spectrum, use the trained transformer neural network to spectrally un-mix the spectral data in the set of multiple spectral bands.

This summary does not necessarily describe the entire scope of all aspects. Other aspects, features, and advantages will be apparent to those of ordinary skill in the art upon review of the following description of specific embodiments.

BRIEF DESCRIPTION OF THE DRAWINGS

Embodiments of the disclosure will now be described in detail in conjunction with the accompanying drawings of which.

DETAILED DESCRIPTION

Figure 1:
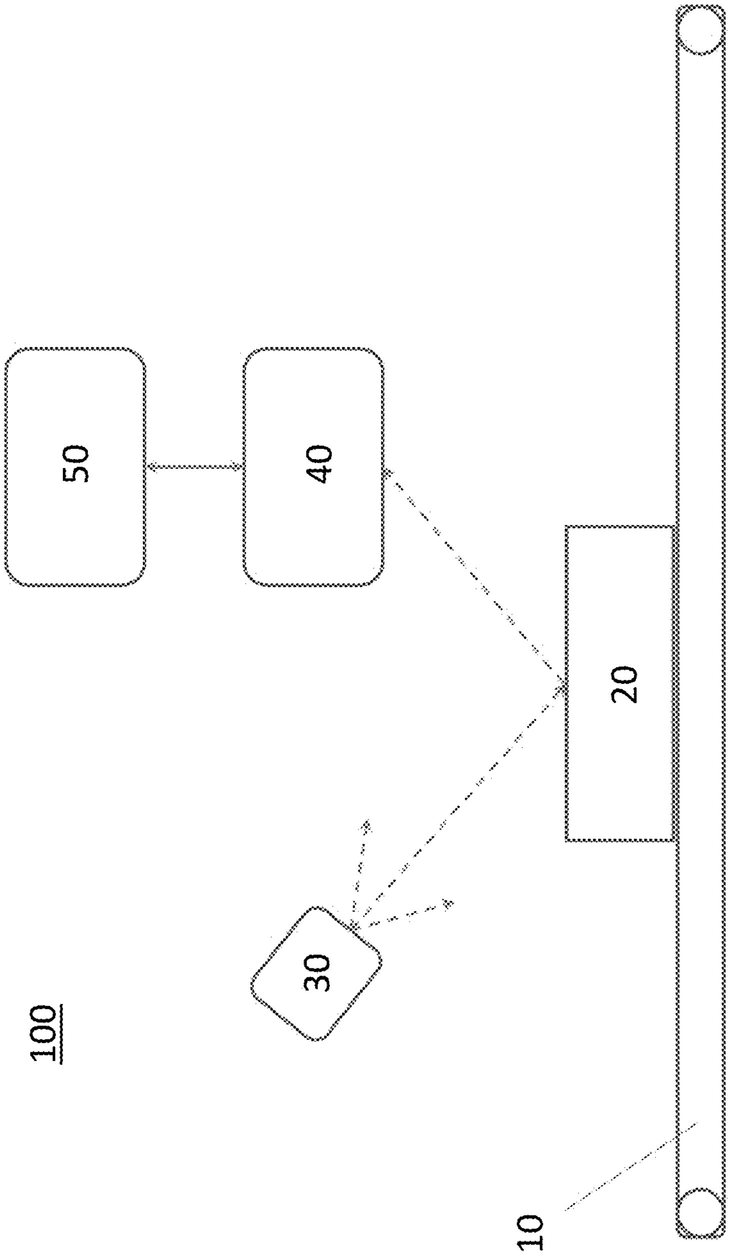
FIG. 1 is a schematic diagram of a hyperspectral imaging system according to an embodiment of the disclosure.

The present disclosure seeks to provide novel methods and systems for performing hyperspectral imaging and data analysis. While various embodiments of the disclosure are described below, the disclosure is not limited to these embodiments, and variations of these embodiments may well fall within the scope of the disclosure which is to be limited only by the appended claims.

Throughout the disclosure, the term “hyperspectral” is used. Generally, hyperspectral is considered to refer to about 30-300 wavelength “spectral” bands. However, embodiments of the present disclosure may use any suitable number of wavelength bands, for example less than 30 bands or more than 300 spectral bands.

Generally, embodiments of the disclosure relate to methods and systems for identifying materials in an object, using hyperspectral imaging. The identification is facilitated by the use of an appropriately trained machine learning model, such as a deep learning model, comprising for example one or more convolutional neural networks (CNNs). Other types of suitably trained neural networks may be used, such as fully-connected feedforward, recurrent networks, Autoencoders, or Transformers. The neural networks may be trained to detect the materials within transparent objects with a relatively high degree of accuracy (e.g. at least 90%). The neural networks may additionally analyze up to 100% of the object’s material, as opposed to a subsample of the object’s material(s). This is in contrast to existing methods of material identification that, because of data volume requirements, typically resort to sampling only a few areas of the object, or only look at specific spectral bands (to reduce the size of the spectral data), thereby frequently misidentifying an object’s material if the object comprises more than one material.

Generally, according to embodiments of the disclosure, deep neural networks are used to spectrally un-mix visible-to-infrared spectral signals generated by a hyperspectral imaging sensor capturing light reflected by the object. This spectral un-mixing allows the spectral signatures specific to the materials of the transparent object (i.e. end-members) to be extracted, while ignoring the spectral signature(s) of any underlying materials (e.g. of any materials belong to a different object to the one being analyzed). In particular, the deep neural networks may spectrally un-mix one or more spectral signatures of the object and classify them according to one or more corresponding end-member categories (an end-member category referring to a material that a given spectral signature is associated with). This in turn allows for retrieval of an overall spectral signature of the transparent object, even in low-SNR situations.

Generally, according to embodiments of the disclosure, there is provided a method of using hyperspectral imaging to identify one or more materials in an object. The method includes illuminating the object with light, wherein at least some of the light is reflected by the object. The light may comprise any of, or a combination of, visible, near-infrared, short-wave infrared, mid-wave infrared, and long-wave infrared light. A hyperspectral imaging sensor is then used to capture one or more hyperspectral images of the object, based on the reflected light. The hyperspectral images include spectral data within each of multiple wavelength bands, the number of bands depending on the sensitivity and nature of the hyperspectral imaging sensor. The greater the number of wavelength bands that are used, the greater the resolution of the data but the greater the data-processing requirements of the overall system.

In order to better manage the potentially large volumes of data that are generated by the hyperspectral imaging sensor, the data may be compressed and then transmitted to a remote image processing device better equipped for downstream image processing and analysis. The compressed data is then decompressed prior to processing.

The hyperspectral images are then input to a trained machine learning model, such as a deep learning model, which may include, for example, one or more convolutional neural networks (CNNs). As described above, these deep neural networks are then used to spectrally un-mix the spectral data within the hyperspectral images so as to extract one or more spectral signatures from the hyperspectral data. Based on the one or more extracted spectral signatures, one or more materials comprised in the object may be identified. According to some embodiments, the relative quantities of different materials may be identified.

Turning now to FIG. 1, there is shown a schematic diagram of a hyperspectral imaging system 100 according to an embodiment of the disclosure.

Hyperspectral imaging system 100 generally includes a device, such as a conveyor 10, for transporting objects 20 to be analyzed. One such object 20 is shown on conveyor 10 in FIG. 1. Object 20 is at least partially transparent to visible light, and for example may only reflect up to about X % of light.

Positioned at a distance from object 20 is a light source 30 such as broadband (i.e. full-spectrum) light sources. The distance separating object 20 from light source 30 is generally configurable and may depend, for example, on the intensity of light source 30 as well as the size of the area to be imaged. Light source 30 is configured to emit light having at least an infrared component, and for example is configured to emit broadband light in a wavelength range of 400 nm-2,500 nm.

Although only one light source is shown in FIG. 1, multiple light sources may be used. For instance, a light source in front of the object and a symmetrically positioned light source at the rear of the object may be used. At least some of the light emitted by light source 30 is reflected by object 20 and is received at a hyperspectral imaging sensor 40 positioned and configured to detect infrared light reflected by object 20. According to one embodiment, hyperspectral imaging sensor 40 may be a Specim™ FX10, FX17, FX50, or short-wave infrared hyperspectral imaging camera. According to some embodiments, black materials may reflect light in the 2.7-5.3 μm range, while other materials may typically reflect light in the 0.9 to 5.3 μm range.

An edge processing device 50, comprising a Field-Programmable Gate Array (FPGA), is communicatively coupled to hyperspectral imaging sensor 40 and is configured to receive (e.g. using wired or wireless means) the hyperspectral images captured by hyperspectral imaging sensor 40.

Hyperspectral imaging system 100 may be configured to process an assembly line of objects 20, with a series of objects 20 to be analyzed being conveyed by conveyor 10. According to some embodiments, instead of objects 20 being conveyed by conveyor 10, objects 20 may be stationary and, instead, one or more of light source 30 and hyperspectral imaging sensor 40 may be configured to be movable relative to objects 20. This is typically the case with aerial or orbital hyperspectral imaging, where the sun provides the required full-spectrum broadband lighting, and the hyperspectral imaging sensor and end-processing device are mounted on a moving platform such as a satellite or an airplane. According to still further embodiments, object 20, light source 30, and hyperspectral imaging sensor 40 may all be stationary.

As each object 20 is illuminated by light source 30, hyperspectral imaging sensor 40 receives light reflected by object 20 and captures visible-to-infrared imagery of object 20. Because of the transparent nature of object 20, materials within the interior of object 20 also reflect light, and this light may be captured by hyperspectral imaging sensor 40 which may subsequently generate hyperspectral images of such underlying materials. Therefore, hyperspectral imaging sensor 40 may capture hyperspectral images of each layer, or each material, in a multi-layer object. The hyperspectral images generally include hyperspectral data as a function of location, or position, within object 20.

Because of the relatively large volumes of data generated by hyperspectral imaging sensor 40 (for example, 1 Gbps or more), it is preferable to first compress the hyperspectral images prior to processing. Accordingly, edge processing device 50 is configured to compress the hyperspectral images using any of various suitable compression techniques that may be known in the art. According the some embodiments, edge processing device 50 may employ one or more of the compression techniques described in U.S. Pat. No. 11,386,582 B1, incorporated herein by reference in its entirety. Such compression techniques may be implemented and accelerated on one or more FPGAs to compress the data down to as little as 10% of its original size, and accelerate the transmission of the data to a downstream processing device, as described in further detail below.

Figure 2:
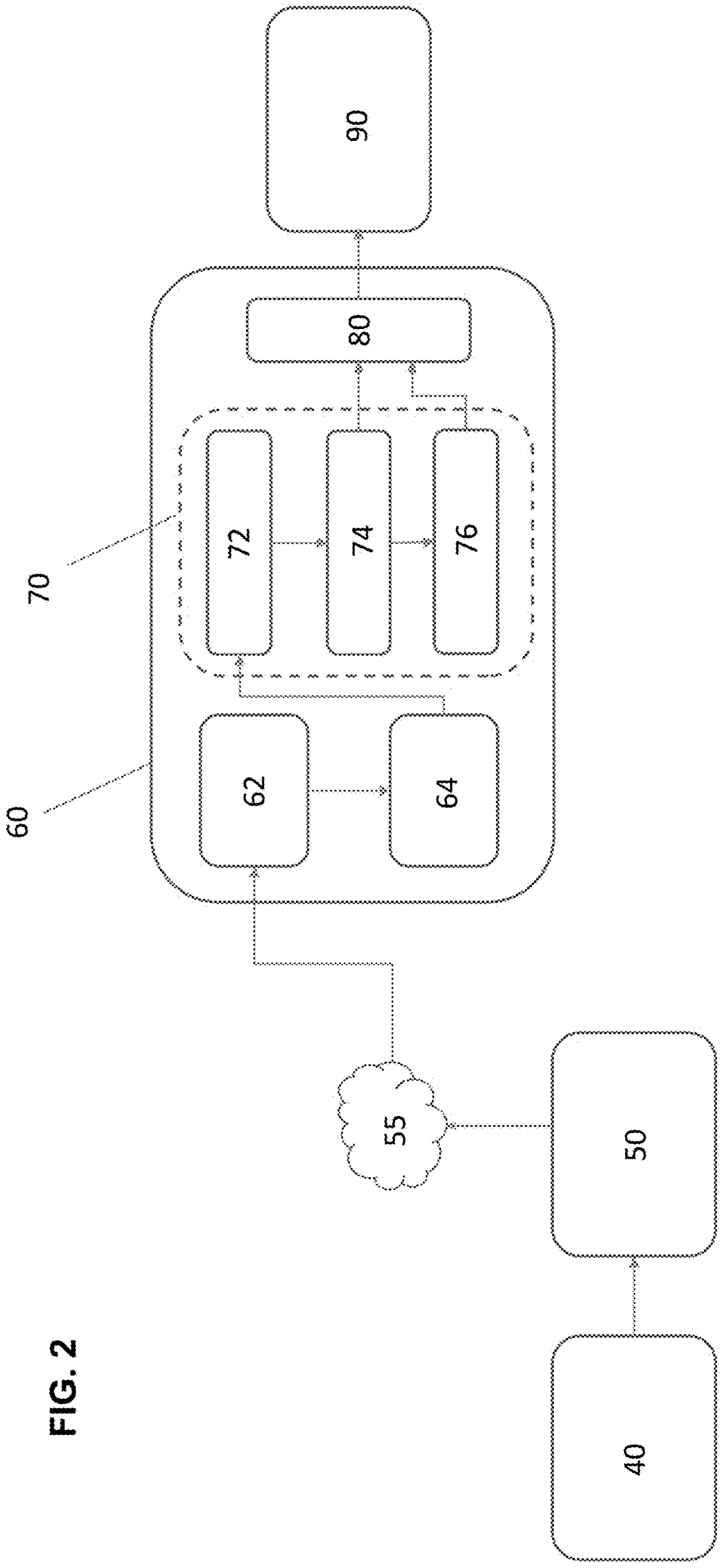
FIG. 2 is a schematic diagram of a hardware and software modules used for processing hyperspectral images, according to an embodiment of the disclosure.

Turning now to FIG. 2, there is shown a schematic diagram of hardware and software modules used in combination with hyperspectral imaging system 100, according to an embodiment of the disclosure.

As seen in FIG. 2, hyperspectral imaging sensor 40 transmits hyperspectral images to edge processing device 50 which, as described above, compresses the hyperspectral images. The compressed data is then transmitted over a computer network 55, such as a computer network with network switches and cables, to a computer server 60. For example, a single computer server may be used to analyze multiple streams of incoming data. This may enable spectral analysis of materials pixel-by-pixel using multiple hyperspectral sensors. According to some embodiments, and based on the configuration of the lens of the hyperspectral sensor, materials or objects as little as 2 mm in diameter (i.e. the pixel size being 2 mm×2 mm) can be identified with a hyperspectral imaging sensor mounted approximately 90 cm above the object.

Server 60 includes a second FPGA 62 that receives the compressed data from edge processing device 50 and decompresses the data stream in real-time. The decompressed hyperspectral images are then fed to either, or both, a Graphics Processing Unit (GPU) 64 or a Tensor Processing Unit (TPU) (not shown in FIG. 2). GPU 64 and/or the TPU are configured to execute a trained machine learning model comprising deep neural networks 70. As described in further detail below, neural networks 70 are trained and configured to: (1) spectrally un-mix one or more spectral signatures in the spectral data stream; (2) classify the un-mixed signatures according to one or more end-members; and (3) determine the shape of the object. In particular, neural networks 70 include a spectral un-mixer 72, a spectral classifier 74, and an object detector 76. The output of spectral un-mixer 72 is fed into spectral classifier 74. The outputs of spectral classifier 74 and object detector 76 are provided to a post-processing module 80 which post-processes the data as described in further detail below, and outputs, for example, data 90 (for example, one or more images) indicating a shape of object 20 as well as relative quantities of one or more materials comprised in object 20. The neural networks described above can be combined into a single neural network, two neural networks, or three distinct neural networks as in the case shown in FIG. 2.

While compression of the data and transmission of the compressed data to computer server 60 may be useful, according to some embodiments edge processing device 50 may itself process the hyperspectral images without the need to transfer the data to computer server 60. In other words, according to some embodiments, edge processing device 50 may perform the function of computer server 60, and may execute the neural networks used to identify the materials within object 20.

Figure 3:
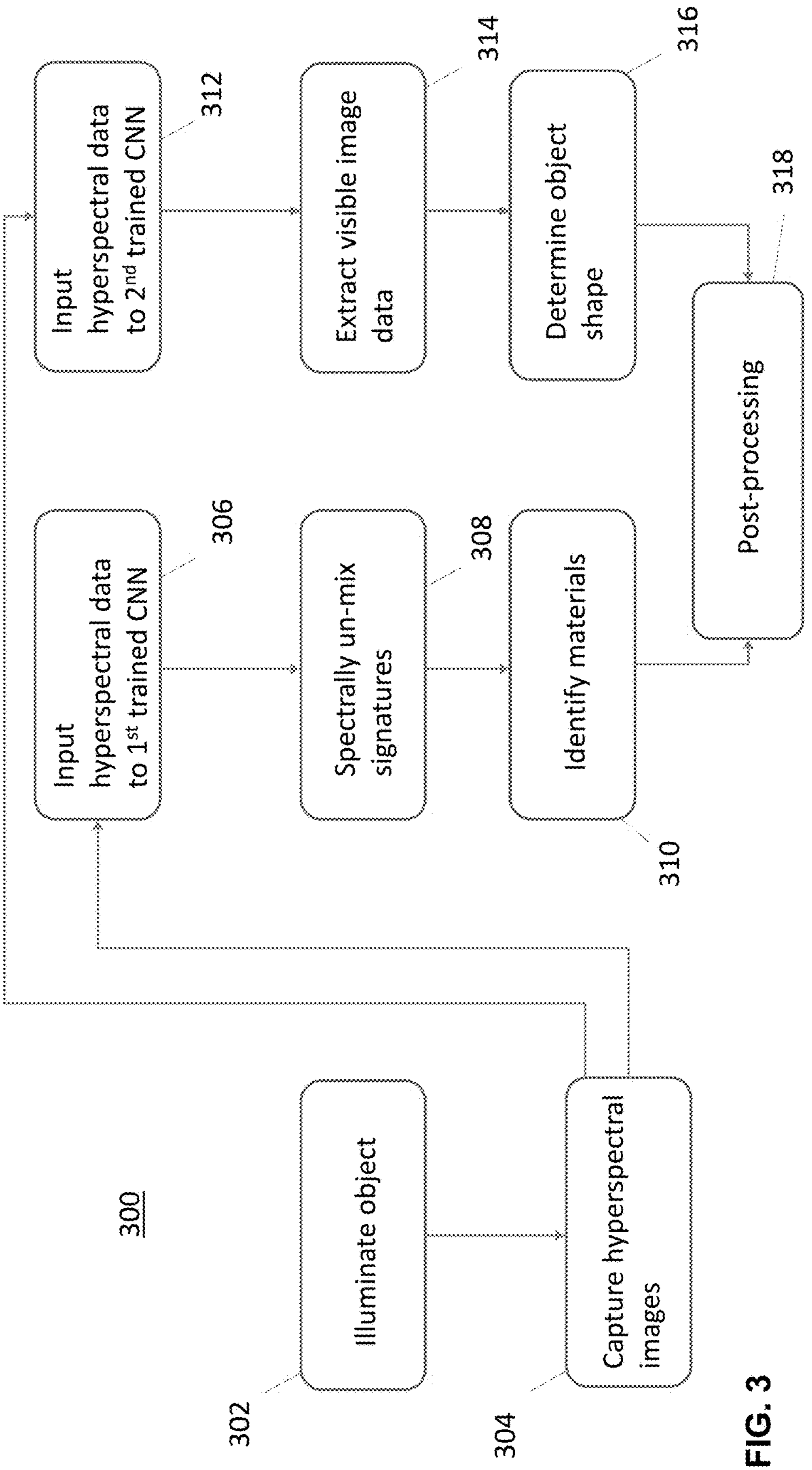
FIG. 3 is a flow diagram of a method of performing hyperspectral imaging according to an embodiment of the disclosure.

Turning now to FIG. 3, there is shown a flow diagram of a general method of performing hyperspectral imaging according to an embodiment of the disclosure.

Starting at block 302, object 20 is illuminated by visible-to-infrared (full-spectrum) light source 30.

At block 304, one or more hyperspectral images of object 20 are captured by hyperspectral imaging sensor 40, based on reflected light received at hyperspectral imaging sensor 40. The sensitivity of hyperspectral imaging sensor 40 may depend on the particular material(s) that is/are being detected. For example, near-infrared sensors may operate between 900-1,700 nm, whereas middle wavelength infrared sensors may operate between 2,700-5,300 nm.

At block 306, the hyperspectral image data (e.g. spectral information along the spectral dimension) is input to a first trained CNN (or, more generally, a first trained neural network).

At block 308, the first trained CNN spectrally un-mixes one or more spectral signatures from the hyperspectral image data.

At block 310, based on the extracted spectral signatures, the relative quantities of different materials within object 20 are identified.

At block 312, the hyperspectral image data is input to a second trained CNN (or, more generally, a second trained neural network).

At block 314, the second trained CNN extracts visible image data (e.g. spatial information) from the hyperspectral image data.

According to some embodiments, instead of extracting the visible image data from the hyperspectral image data, the visible image data may be obtained from a secondary RGB camera, for example.

At block 316, based on the extracted visible image data, a shape of object 20 is determined.

At block 318, the outputs of blocks 310 and 316 are combined and post-processed, as described in further detail below.

According to embodiments of the disclosure, the deep neural networks responsible for spectrally un-mixing the spectral data, and classifying the extracted spectral signatures, are designed using convolutional or Transformer neural networks that process the input imagery pixel-by-pixel. In other words, each of spectral un-mixer 72 and spectral classifier 74 takes as its input a given pixel and all of its associated spectral information.

In addition to convolutions, vectors representing pixels are passed through each neural network (i.e. both spectral un-mixer 72 and object detector 76) in a feed-forward fashion to different layers of the network, including but not limited to dropout layers, batch normalization layers, average/max pooling layers, fused-layers (i.e. concatenation of different layer outputs), skip-connections, and different non-linearities as the hidden layer activations (e.g. rectified linear unit or sigmoid function), and finally to an output layer. The dimension of each output layer matches the number of end-members that the spectral signatures will be un-mixed into.

To illustrate this concretely, take for example the detection of five different kinds of transparent plastic on a waste stream passing through a conveyor belt system. The five different plastic types may be, for example, PET (Polyethylene terephthalate), PP (Polypropylene), PS (Polystyrene), HDPE (High-density Polyethylene), and LDPE (Low-Density Polyethylene), and are associated with five different end-members. The "background" of the conveyor belt is added as another distinct end-member, leading to a total of six end-members into which captured spectral signatures would be un-mixed.

The eventual output vector is a softmax layer, meaning the summation of the components in the vector is equal to 1. Each element in the vector represents the "abundance factor" (i.e. the ratio) of that end-member spectrum to the original reference spectral data of each end-member. For example, assuming the end-members are in the order of PET, PP, PS, HDPE, LDPE, and Belt, a vector (0.1, 0.15, 0.2, 0.25, 0.28, 0.02) would mean that the input spectral signature consisted of 10% PET, 15% PP, 20% PS, 25% HDPE, 28% LDPE and 2% Belt. More generally, following on from the above, example, the output would be a vector with $x_1$% of PET, $x_2$% of PP, $x_3$% of PS, $x_4$% of HDPE, $x_5$% of LDPE, and $x_6$% of "conveyor belt", wherein the sum of the $x_i$ values is 1.

Training the deep neural networks is achieved using synthetic data that is generated at training time using clean and opaque end-member spectra that have been captured in a laboratory setting. Revisiting the above example, this would mean that clean and opaque spectral signatures of each of the six different material types (PET, PP, PS, HDPE, LDPE, and Conveyor Belt) have been captured before training begins.

At the beginning of the training, spectral signatures are sampled for each of the six categories and are used to create a Dirichlet distribution vector that sums to 1. This vector represents the abundance factors which are used to create a weighted sum. In other words, the assumption is that each material comprises a linear combination of its end-members. For example, the spectral signature of a multilayered material may equal, for example, 0.1*(spectral signature of PET)+0.9*(spectral signature of nylon).

The training begins by describing the generation of a synthetic data point X which is used as a training vector $X \in R(N \times 1)$, where R denotes real numbers and N is the dimension of the spectral signature (i.e. the number of wavelength bands contained in the spectral signature). Given a set of end-member spectra $K \in R(L \times N)$, where L is the number of end-members and each end-member is a spectral signature of dimension ($N \times 1$), the training vectors are generated as follows. Note that the end-member spectra also include the target spectral signatures that are to be detected. The training dataset includes the "ground truth", i.e. the end-member(s) that actually relate to the spectral signature(s) in question.

First, abundance factors A are generated, where $A \in R(L \times 1)$. The abundance factors are to be used to generate the synthetic training vector, using a Dirichlet distribution. A Dirichlet-distributed random variable can be seen as a multivariate generalization of a Beta distribution, and is a conjugate prior of a multinomial distribution in Bayesian inference. A vector of length L (the number of end-members to be mixed) is generated, and the Dirichlet distribution ensures that the sum of the vector's components is equal to 1. This vector then provides the abundance factors (i.e. the weights to be used) in a weighted sum for linear mixing of the end-member spectra.

The training vector is then created using a weighted sum of the end-member spectra and the randomly generated abundance factors, as follows:

$$X = \sum_{i=1}^{L} A_i \times K_i$$

In practice, the synthetic data points are generated at run-time, with each training data point in each mini-batch containing different abundance factors. In the case where there is more than one available spectral signature per end-member, one spectral signature is randomly sampled per end-member, per training data point. For example, the training dataset could have two different signatures for PET (e.g. one for white PET and one for orange PET). As another example, different grades of a particular material could have different spectral signatures. This creates a relatively wide array of training data points and provides a very good underlying distribution for the training dataset. Additionally, white or Gaussian noise is added to each generated data point to further increase the robustness of the neural network.

Since the training process is supervised, ground-truth outputs are needed for training the neural network. Since the goal is to un-mix mixed spectra, the ground-truth is the vector of abundance factors A. Therefore, for each training data point, X is the input, and A is the ground-truth to the neural network.

In order to train object detector 76, the hyperspectral image data is converted to visible image data by creating a hyperspectral, or a 3-channel (e.g. RGB) image, by averaging wavelength-ranges of the hyperspectral image data (which may comprise, for example, a hyperspectral data cube). Once this conversion from hyperspectral data cube to a multispectral or a 3-channel data cube is completed, a deep learning-based 2D object detector network, such as RetinaNet, Faster R-CNN, Yolo, EfficientDet, or any custom-designed object detection neural network may be used to train object detector 76.

According to some embodiments, instead of extracting the visible image data from the hyperspectral image data, the visible image data may be obtained from a secondary RGB camera, for example.

The results of spectral classifier 74 and object detector 76 therefore enable the identification of each material in the object, as well as its amount relative to other materials in the object, and also the shape of the object. These results may be combined and post-processed in post-processing module 80.

For example, post-processing module 80 may minimize the incidence of false positives or false negatives at the pixel-level by applying one or more post-processing algorithms such as Conditional Random Fields (CRF) to the output of spectral classifier 74 and/or object detector 76. Post-processing module 80 may additionally, at the pixel-level, correct or otherwise adjust the output of spectral classifier 74 and/or object detector 76 based, for example, on one or more pre-set or empirically-determined rules.

As an example, the output of spectral classifier 74 may identify a particular pixel as comprising a certain percentage of a first spectral signature associated with a first material, and a certain percentage of a second spectral signature associated with a second material. Post-processing module 80 may be configured to apply one or more thresholds to these outputs, and may adjust the outputs based on these thresholds. For instance, post-processing module 80 may ignore the first spectral signature associated with the first material if the percentage associated with the first spectral signature is below a certain threshold.

In another example, post-processing module 80 may adjust the output of spectral classifier 74 for a particular pixel based, for example, on the output of spectral classifier 74 in respect of other pixels. For instance, if spectral classifier 74 identifies a particular pixel as primarily comprising a spectral signature associated with a certain plastic, while all other pixels surrounding this pixel are identified as primarily comprising a spectral signature associated with paper (e.g. for a label), then post-processing module 80 may be configured to adjust the spectral signature of the particular pixel so that the spectral signature is that of paper. Such corrections may be required, for example, because light from the light source may scatter off the surface of the object, or the surface of the object may be contaminated with dirt (thereby affecting the output of spectral classifier 74).

As another example, depending on the wavelength of the light that is used, the light may penetrate the outer layer of the object and interact with an underlying layer. Taking the example of a plastic bottle with a paper label, some light may penetrate the label and may be reflected by the plastic underlying the label. As a result, spectral classifier 74 may classify pixels associated with the label as comprising both a proportion of a plastic spectral signature and a paper spectral signature. Post-processing module 80 may therefore be configured to adjust the output of spectral classifier 74 in respect of this pixel so that the dominant spectral signature of the pixel is that of paper and not plastic.

Figure 4B:
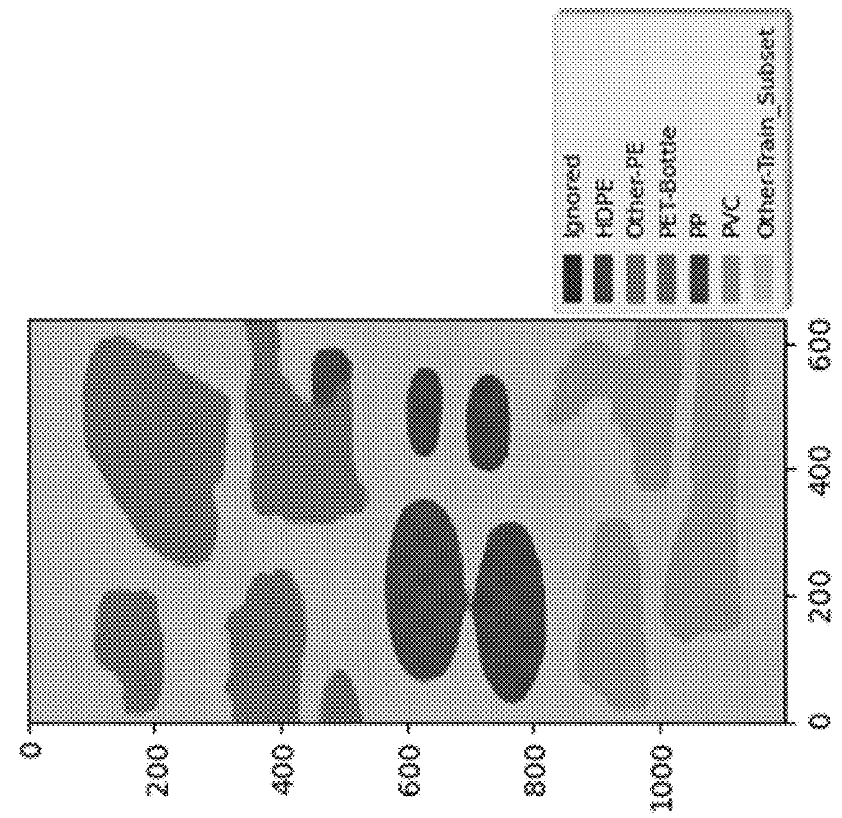
FIGS. 4A-6 show different outputs generated by a post-processing module of a hyperspectral imaging system, according to an embodiment of the disclosure.
Figure 4A:
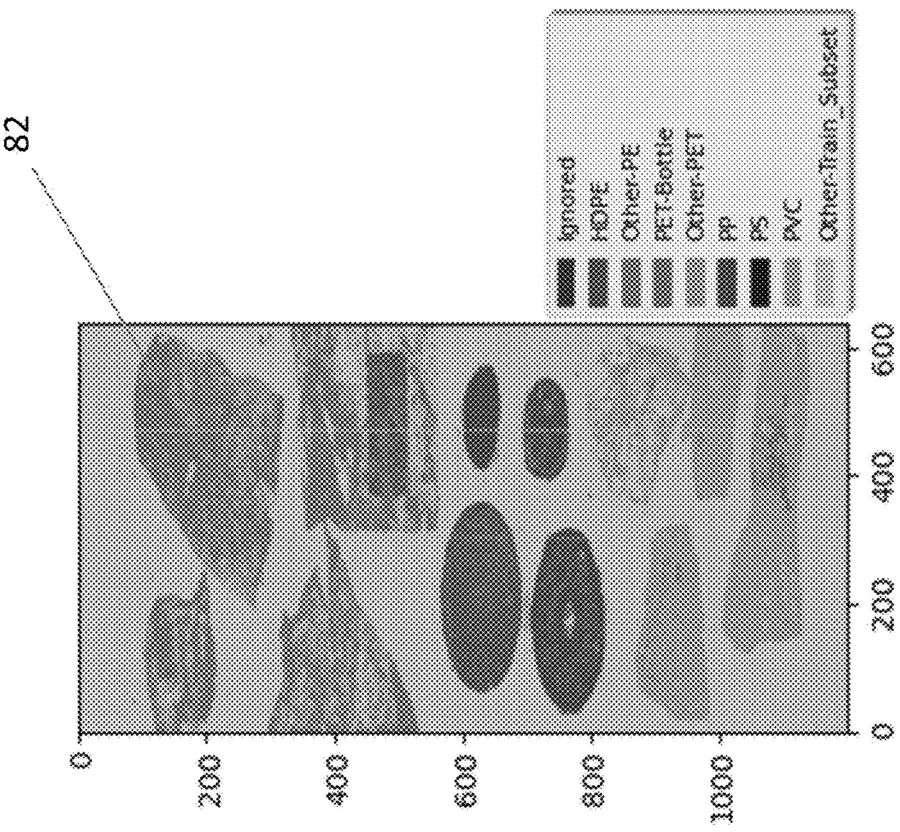

FIGS. 4A-6 illustrate examples of the output of post-processing module 80. For example, as can be seen in FIG. 4A, the shapes of different objects 82 have been identified, as have their respective dominant materials. The output of FIG. 4A shows a significant degree of noise associated with each object 82. Post-processing module 80 may therefore apply one or more CRF algorithms to "clean up" the noise and properly identify the spectral signature associated with each pixel of each object 82, as can be seen by the output illustrated in FIG. 4B.

Figure 5:
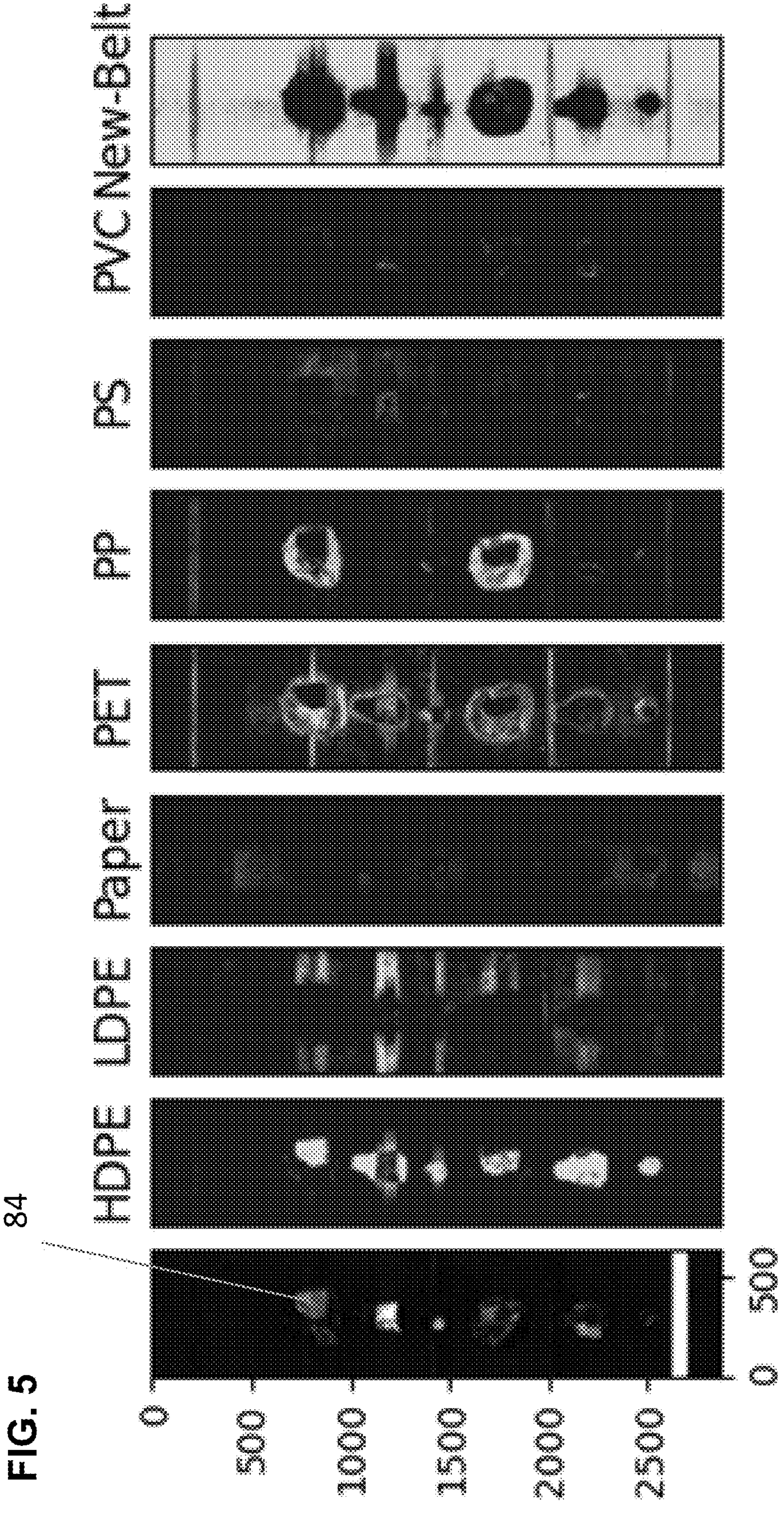
Figure 6:
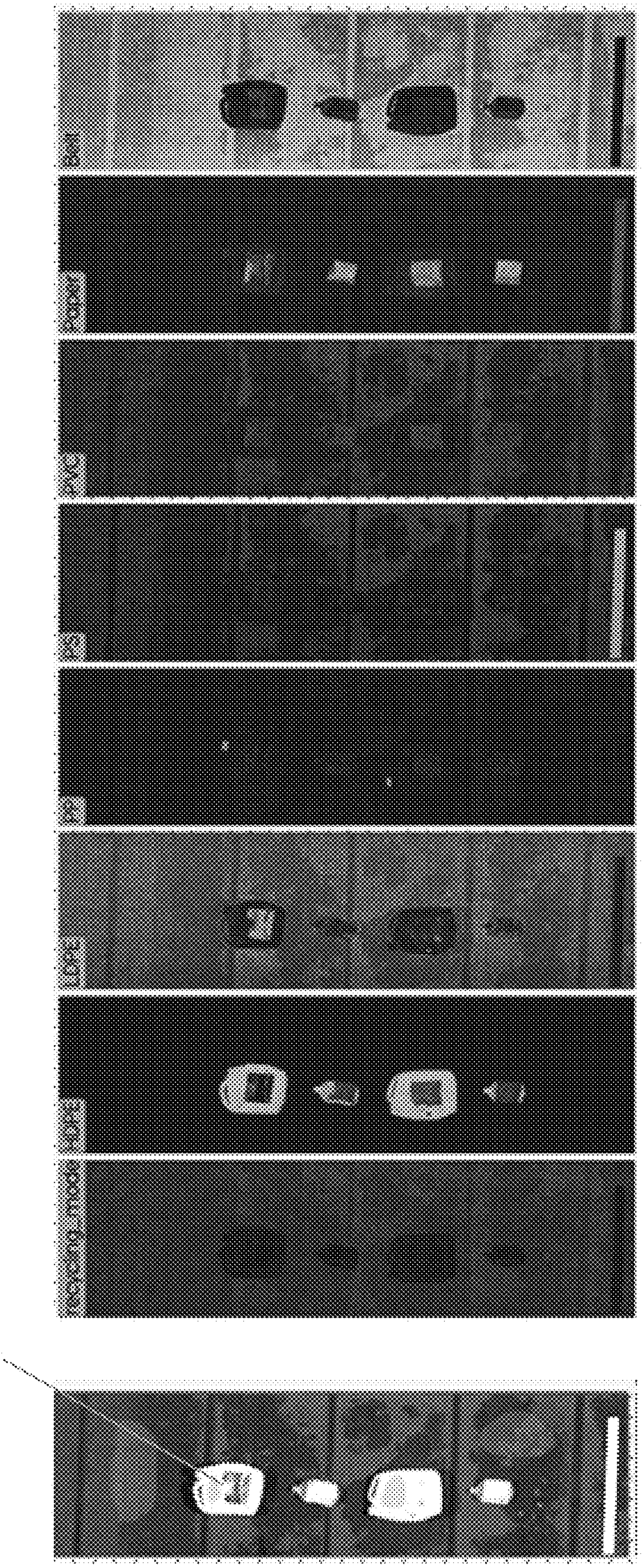

FIGS. 5 and 6 similarly illustrate example outputs of post-processing module 80, showing the identification of different materials in different objects 84. In the case of FIG. 6, the objects being analyzed are milk bottles.

Advantageously, embodiments of the disclosure may be used to analyze up to 100% of an object's materials. This may allow users to define relatively complex rules for processing the object. For example, a user may define a rule such that: "If an object of material X is wrapped by material Y over more than 90% of its surface area, then remove the object from the conveyor belt."

Furthermore, materials may be identified in milliseconds, allowing embodiments of the disclosure to be deployed in applications requiring real-time analysis such as highthroughput sorting and quality assurance/control in numerous manufacturing and defence use-cases. For example, in certain defence use-cases, identifying CBRN (i.e. Chemical, Biological, Radioactive/Radiological, and Nuclear) materials in real-time is key to saving lives.

Figure 7:
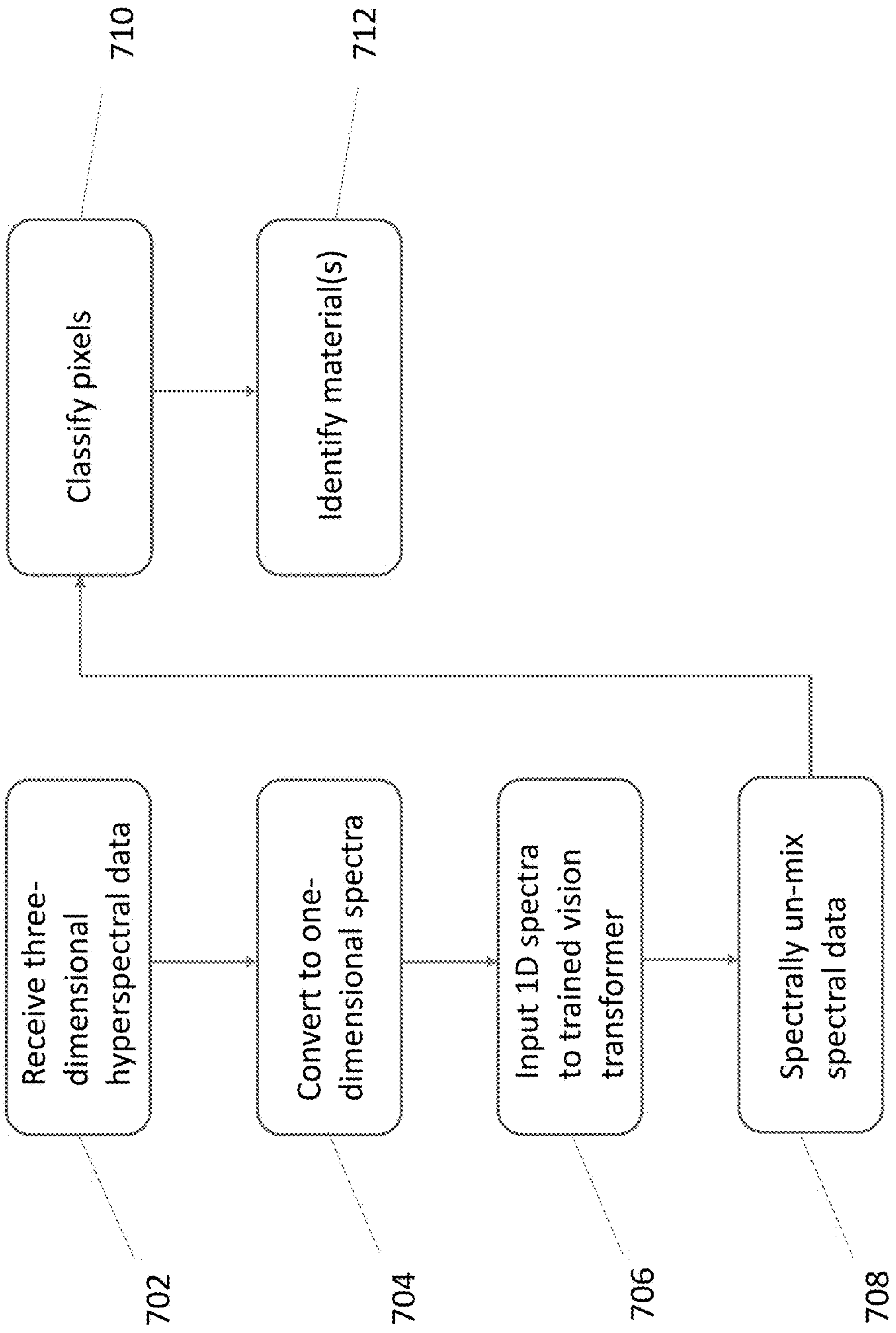
FIG. 7 is a flow diagram of a method of performing hyperspectral data analysis according to an embodiment of the disclosure.
Figure 8:
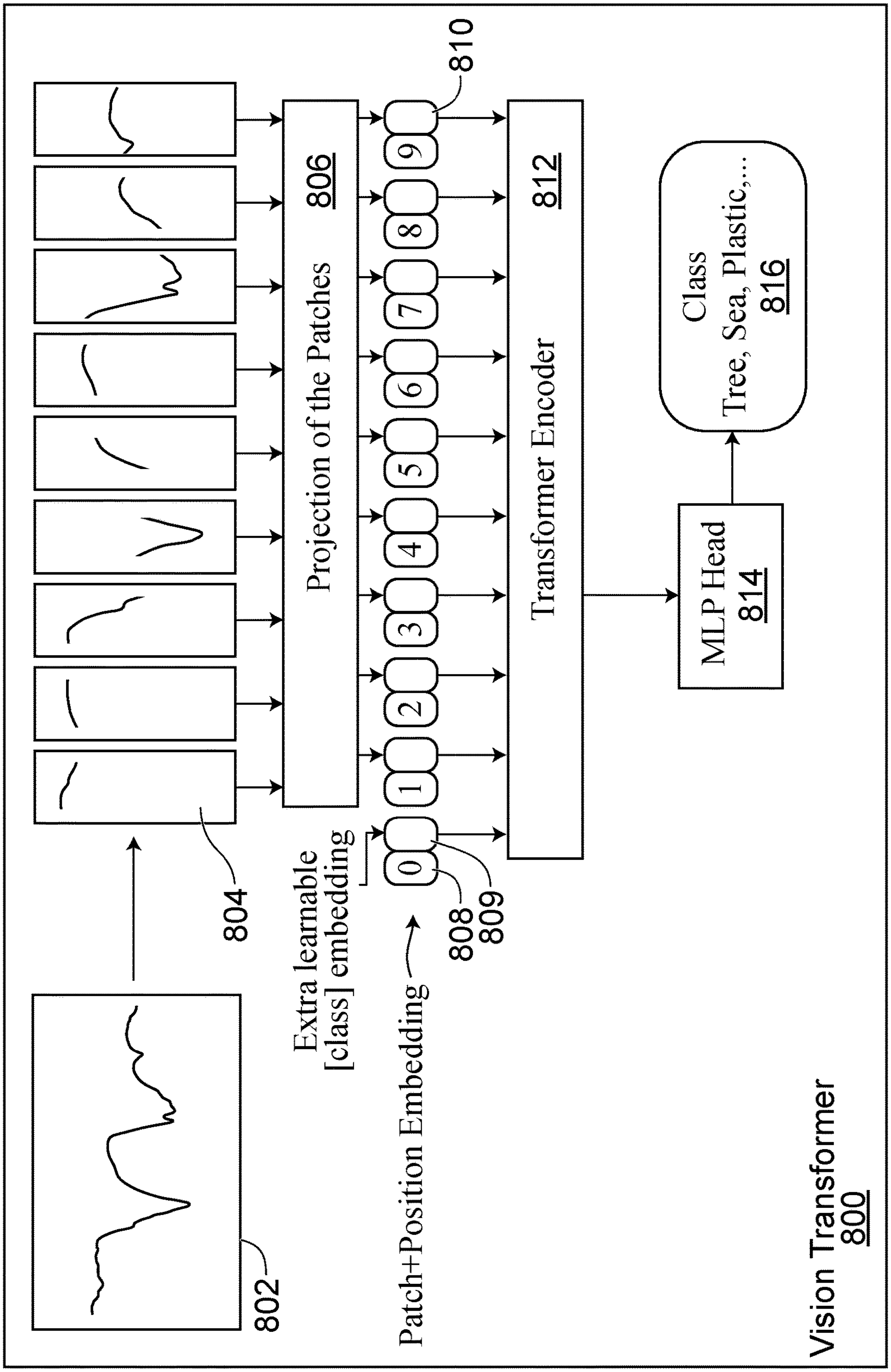
FIG. 8 is a schematic diagram of a vision transformer for use in processing hyperspectral data, according to an embodiment of the disclosure.
Figure 9:
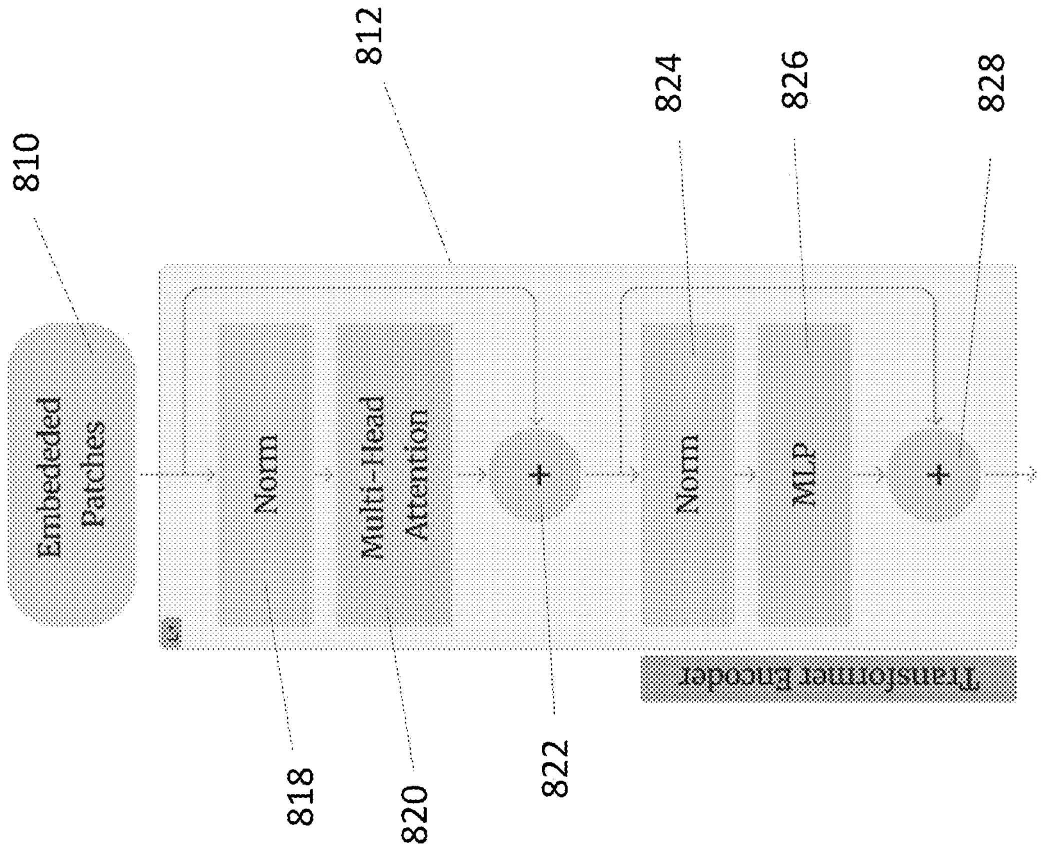
FIG. 9 is a schematic diagram of a transformer encoder according to an embodiment of the disclosure.

Referring now to FIGS. 7-9, there are described further methods and systems for performing hyperspectral data analysis. Such methods and systems may be used in the context of material identification, for example as described above in connection with FIGS. 1-6.

Generally, the below-described methods and systems use a machine learning model that comprises a one-dimensional vision transformer neural network for processing hyperspectral data. The one-dimensional vision transformer neural network (which may be referred to throughout this disclosure as "the vision transformer" for simplicity) is configured to process the hyperspectral data in a one-dimensional format. In contrast, traditional hyperspectral data analysis relies on manual feature extraction and domain-specific knowledge, which can be time-consuming and error-prone. While the below embodiments are described in the context of a vision transformer, non-vision transformers may alternatively be used in order to process the hyperspectral data.

The described vision transformer may achieve relatively high classification accuracies while also providing interpretability through attention scores. For example, during testing the vision transformer achieved an average F1 score of 80%. This interpretability may assist domain experts in understanding the model's decision-making process. As described in further detail below, the vision transformer divides each pixel that it receives into smaller patches, treating each patch as a token and then processing these tokens through multiple layers. The attention mechanism allows the model to focus on different parts of the image when making predictions. Interpretability, in this case, may come from analyzing these attention scores. By examining which parts of the image the model focuses on, it is possible to gain insights into why the model made a certain prediction, and to uncover biases or misinterpretations the model learned from the data. This may assist with debugging and enhancing the model by identifying where its focus might be misplaced or inconsistent. Moreover, attention scores reveal how different parts of the image interact, aiding in the understanding of spatial relationships.

Turning to FIG. 7, there is shown a flow diagram of a method of processing hyperspectral data, according to an embodiment of the disclosure.

At block 702, hyperspectral data is received. As described above, the hyperspectral data may comprise a three-dimensional data cube of spectral data. Each two-dimensional plane or slice of the cube may comprise an array of pixels representing a two-dimensional image of, for example, the object that was imaged by a hyperspectral sensor in order to obtain the hyperspectral data. For each pixel, spectral data is contained in each spectral band of a total number of spectral bands. Therefore, each pixel is associated with spectral data from a number of different spectral, or frequency, bands. The number of spectral bands across which data is captured will typically depend on the characteristics of the hyperspectral sensor that performs the imaging.

At block 704, the hyperspectral data is converted into a number of one-dimensional (1D) spectra. Each 1D spectrum comprises the spectral data associated with a single pixel of the array and across all bands. Generally, converting the three-dimensional data cube into one-dimensional spectra decreases the number of parameters needed to be processed by the vision transformer, resulting in optimized computation and inference costs.

At block 706, the 1D spectra (or "pixels") are input to the vision transformer. The number of pixels that the vision transformer can process in parallel will depend on the processing power being used run the vision transformer. As described in further detail below, each 1D spectrum is divided by the vision transformer into a number of patches, with each patch consisting of the spectral data for each band in a subset of the total number of spectral bands. The number of bands that are represented in each patch may vary. For example, according to some embodiments, each patch may comprise data from 8 spectral bands. In such a case, patch 1 will include data from bands 0-7 for pixel 1, patch 2 will include data from bands 8-15 for pixel 1, etc. The size of the array for each patch may also depend on the total number of patches. Generally, each 1D spectrum is divided into a number of patches such that at least one significant event is identifiable in each patch. For example, the patch size should not be too small such that no useful information is contained in the patch, while not being too big such that the model has difficulty in efficiently extracting the information from the patch. Different patch sizes may be tested to identify the patch size that leads to the best performance.

At block 708, for each 1D spectrum, the vision transformer spectrally un-mixes the spectral data contained across all bands in the 1D spectrum. As a result of the un-mixing, the vision transformer is able to output an indication of a relative quantity of a material identified in the pixel relative to other materials. For example, for a given pixel, the vision transform may identify the pixel as comprising 5% plastic, 25% wood, and 70% glass.

According to some embodiments, the vision transformer may be trained to perform classification based on the results of the un-mixing. In such a case, and as can be seen in block 710, based on the un-mixed spectral data, the vision transformer may classify each pixel as belonging to a certain classification. Classification may comprise, for example, classifying the pixel as belonging to a certain class of material selected from among a preset number of material classes. For instance, following on from the above example, the vision transformer may classify the pixel as belonging to glass.

At block 712, according to some embodiments, the vision transformer may identify a dominant material of an object represented by the hyperspectral data. For example, based on the classification of each pixel, the vision transformer may identify a material of which the object associated with the hyperspectral data is predominantly composed. The vision transformer may take into account the shape and/or boundaries of the object when identifying the material (s) of the object. Object identification may be performed using a different model, such as a trained CNN as described above in connection with object detector 76. For some use cases, there may be no need to identify any object(s) in the hyperspectral data, and the goal may be to simply classify each pixel.

Turning now to FIG. 8, the structure of vision transformer neural network 800 is described in more detail.

As can be seen, a one-dimensional spectrum 802 (i.e., an array of spectral data for a single pixel in the original hyperspectral cube) is input to vision transformer 800. In reality, vision transformer 800 may process many 1D spectra (or "pixels") in parallel, but for clarity FIG. 8 is shown with vision transformer 800 processing a single pixel. The 1D spectrum 802 is then converted into a number of fixed-size, one-dimensional patches 804 as described above.

Each patch 804 is passed to a patch embedding layer 806. Patch embedding layer 806 applies to each patch 804 a one-dimensional convolution that outputs, based on each patch 804, an embedded patch 810. In each embedded patch 810, the values within each associated patch 804 have been transformed into a lower-dimensional space using a linear transformation. This may assist in capturing important features within the patch 804.

Each embedded patch 810 is then further embedded with positional information 808 identifying the position of the patch 804 in relation to one or more other patches 804. In other words, positional embeddings 808 encode the position or location of each patch 804 in the 1D spectrum, and are introduced to provide the model with information about the relative spatial arrangement of the patches 804.

For the positional embedding 808 of index 0, a learnable class token 809 (or CLS token) is added during training. CLS token 809 is initially set to zero, and during training gathers information from all embedded patches 810 using a Multihead Self Attention (MSA) layer, as described in further detail below. When vision transformer 800 is trained to perform classification, only the hidden outputs from the CLS token 809 associated with each input pixel are used as input to the classification layer (i.e., layer 816 described in further detail below). All embedded patches 810 (including positional embeddings 808 and CLS token 809) are then input to a transformer encoder 812.

The structure of transformer encoder 812 is shown in more detail in FIG. 9. In particular, transformer encoder 812 includes a first normalization layer 818 connected to a Multihead Self Attention (MSA) layer 820. MSA layer 820 is connected to a layer 822 which additionally receives embedded patches 810. The output of layer 822 is connected to a second normalization layer 824 which is connected a Multi-Layer Perceptron (MLP) layer 826. MLP layer 826 is connected to a layer 828 which additionally receives the output of layer 822. According to some embodiments, MLP layer 826 may be similar to the MLP layer described in "*AN IMAGE IS WORTH* 16×16 *WORDS: TRANSFORMERS FOR IMAGE RECOGNITION AT SCALE*", by Dosovitskiy, A., et al., Google Research, Brain Team, which can be found at https://arxiv.org/pdf/2010.11929.pdf, and is herein incorporated by reference in its entirety.

At normalization layer 818, embedded patches 810 are normalized. Normalization may make the transformer model more robust and may also assist in the transformer model converging more rapidly toward a classification. According to some embodiments, normalization rescales the data within each embedded patch 810 in such a way that the mean is zero and the standard deviation is one.

At MSA layer 820, MSA layer 820 applies a scaled dot-product attention operation multiple times in parallel, wherein each application of attention is akin to having a separate "head" focusing on a specific aspect of the data. These heads involve distinct linear transformations that allow the model to process and understand the input data from various perspectives. Each head generates its own set of outputs by attending to different combinations of queries, keys, and values within the data. The individual outputs from all the heads are then combined together by concatenating them and transforming their concatenated representation into the final output of MSA layer 820.

The output of MSA layer 820 is then passed to layer 822 at which embedded patches 810 are added to the output of MSA layer 820. During the training, one or more stochastic depth layers are applied at block 822, and randomly drop (skip) entire layers to help prevent overfitting and to make the training process more robust, for example as described in "*Deep Networks with Stochastic Depth*", Huang Gao, et al., Cornell University, Tsinghua University, which can be found at https://arxiv.org/pdf/1603.09382v3.pdf and is incorporated herein by reference in its entirety.

The output of block 822 is passed to normalization layer 824 at which the input is normalized as described above. The output of normalization layer 824 is passed to MLP layer 826 which learns a mapping between inputs and outputs. By adjusting the weights and biases associated with each connection between nodes during the training (a process known as backpropagation), MLP layer 826 learns to approximate complex functions and identify patterns in the data. According to some embodiments, MLP layer 826 contains two layers with Gaussian Error Linear Unit (GELU) activation functions for non-linearity.

The output of MLP layer 826 is then passed to layer 828 at which the output of layer 822 is added. The output of layer 828 is then passed to a Multilayer Perceptron (MLP) Head layer 814 (FIG. 8). According to some embodiments, MLP Head layer 814 applies a specific activation function, such as the softmax activation function, to convert the raw output values into probability distributions over multiple classes. The output of MLP Head layer 814 may therefore be a vector in which the summation of the components is equal to 1. The output of MLP Head layer 814 is representative of the un-mixing of the spectral data contained within 1D spectrum 802.

If vision transformer 800 has been trained as a classifier, the output of MLP Head layer 814 is passed to a classification layer 816 which, based on the un-mixed spectral data of 1D spectrum 802, outputs a classification of the pixel associated with 1D spectrum 802. For instance, if the un-mixed spectral data is indicative of a spectrum principally similar to plastic, then classification layer 816 may classify the pixel as being associated with plastic.

Further operations may be performed based on the classification of each pixel in the hyperspectral data cube. For example, another model or algorithm (such as another vision transformer, a traditional convolutional model, an LSTM, or any other model described herein), may be configured to identify one or more dominant materials associated with the hyperspectral data.

According to one exemplary embodiment, training of vision transformer 800 may use the following configurations:

Patch Size: 8

Hidden Size: 128 (The total number of 1D convolution filters used during the patch embedding)

Depth (Number of Transformer Blocks): 12 (FIG. 9 represents one such transformer block)

Number of Attention Heads in MSA Layer 820: 8

MLP Dimension: 512

It shall be recognized that the above parameters are exemplary in nature, and that any other suitable parameters may be used depending on the use case.

During training, any residuals in the architecture may be randomly dropped through skip connections. This may shrink the depth of the network during training, resulting in more generalizability for the model.

According to some embodiments, the model may be trained using an Adam optimizer with a learning rate of 0.001. The loss function used is the binary cross-entropy for classification tasks. The performance is evaluated based on F1 scores. Model weights are stored during training to track the best performance based on the validation set.

As described above, the one-dimensional vision transformer described herein was able to achieve an average F1 score of 80% on a test set of data. The attention scores obtained during training may offer domain experts the opportunity to understand and trust the decision-making procedure of the model, thereby enhancing its usefulness as a tool in hyperspectral data analysis. Furthermore, the model may be more efficient in its resource utilization, potentially reducing the computational load and speed needed for predictions while maintaining, or even enhancing, the accuracy of the model's output.

The vision transformer model described herein may be improved, for example, by increasing the amount of labeled data, applying data augmentations and preprocessing techniques to further enhance the model's generalization capabilities and robustness, and addressing noise and trends within the hyperspectral data to improve data quality and reduce the potential for overfitting, thus enhancing the model's overall reliability.

Embodiments of the disclosure may be used in various industries and sectors, ad for a variety of applications, including agriculture: monitoring crop health, identifying diseases, assessing soil properties, and managing irrigation based on vegetation health; environmental monitoring: tracking changes in land use, detecting pollution, assessing water quality, and monitoring ecological changes; remote sensing: studying geological features, identifying minerals, mapping terrain, and monitoring changes in landscapes; defence and security: target detection, surveillance, identifying camouflage, and analyzing materials for security purposes; food industry: quality control, detecting contaminants, assessing freshness, and monitoring food processing using spectral signatures; and forestry: monitoring forest health, detecting diseases or pests, and assessing vegetation types and density.

The embodiments have been described above with reference to flowcharts and block diagrams of methods, apparatuses, systems, and computer program products. In this regard, the flowcharts and block diagrams in the figures illustrate the architecture, functionality, and operation of possible implementations of various embodiments. For instance, each block of the flowcharts and block diagrams may represent a module, segment, or portion of code, which comprises one or more executable instructions for implementing the specified logical function(s). In some alternative embodiments, the functions noted in that block may occur out of the order noted in those figures. For example, two blocks shown in succession may, in some embodiments, be executed substantially concurrently, or the blocks may sometimes be executed in the reverse order, depending upon the functionality involved. Some specific examples of the foregoing have been noted above but those noted examples are not necessarily the only examples. Each block of the block diagrams and flowcharts, and combinations of those blocks, may be implemented by special purpose hardware-based systems that perform the specified functions or acts, or combinations of special purpose hardware and computer instructions.

Each block of the flowcharts and block diagrams and combinations thereof can be implemented by computer program instructions. These computer program instructions may be provided to a processor of a general-purpose computer, special-purpose computer, or other programmable data processing apparatus to produce a machine, such that the instructions, which execute via the processor of the computer or other programmable data-processing apparatus, create means for implementing the functions or acts specified in the blocks of the flowcharts and block diagrams.

These computer program instructions may also be stored in a computer-readable medium that can direct a computer, other programmable data-processing apparatus, or other devices to function in a particular manner, such that the instructions stored in the computer-readable medium produce an article of manufacture including instructions that implement the function or act specified in the blocks of the flowcharts and block diagrams. The computer program instructions may also be loaded onto a computer, other programmable data-processing apparatus, or other devices to cause a series of operational steps to be performed on the computer, other programmable apparatus or other devices to produce a computer-implemented process such that the instructions that execute on the computer or other programmable apparatus provide processes for implementing the functions or acts specified in the blocks of the flowcharts and block diagrams.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

Use of language such as "at least one of X, Y, and Z," "at least one of X, Y, or Z," "at least one or more of X, Y, and Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

While the disclosure has been described in connection with specific embodiments, it is to be understood that the disclosure is not limited to these embodiments, and that alterations, modifications, and variations of these embodiments may be carried out by the skilled person without departing from the scope of the disclosure.

It is furthermore contemplated that any part of any aspect or embodiment discussed in this specification can be implemented or combined with any part of any other aspect or embodiment discussed in this specification.

The invention claimed is:

1. A method of processing hyperspectral data, comprising:

receiving the hyperspectral data, wherein the hyperspectral data comprises spectral data for each pixel in a two-dimensional array of pixels, and for each spectral band in a set of multiple spectral bands associated with each pixel;

converting the hyperspectral data into one-dimensional spectra, wherein each one-dimensional spectrum comprises, for a single pixel of the pixels, the spectral data for each spectral band in the set of multiple spectral bands associated with the single pixel;

inputting each one-dimensional spectrum to a trained transformer neural network; and for each one-dimensional spectrum, using the trained transformer neural network to spectrally un-mix the spectral data in the set of multiple spectral bands.

2. The method of claim 1, further comprising, for each one-dimensional spectrum, using the trained transformer neural network to classify, based on the unmixed spectral data, the pixel associated with the one-dimensional spectrum.

3. The method of claim 2, further comprising identifying, based on each classified pixel, one or more materials associated with the hyperspectral data.

4. The method of claim 2, wherein spectrally un-mixing the spectral data comprises:

for each one-dimensional spectrum, using the trained transformer neural network to divide the one-dimensional spectrum into a set of patches, wherein each patch comprises spectral data for each spectral band in a subset of spectral bands of the multiple spectral bands; and spectrally un-mixing the spectral data associated with the set of patches.

5. The method of claim 4, wherein the trained transformer neural network is a trained one-dimensional vision transformer neural network configured to generate, for each patch, a patch embedding by applying a one-dimensional convolution to the patch.

6. The method of claim 5, wherein the trained one-dimensional vision transformer neural network is further configured, for each patch embedding, to embed positional data comprising data indicative of a position of the patch associated with the patch embedding relative to a position of at least one other patch associated with at least one other patch embedding.

7. The method of claim 6, wherein the trained one-dimensional vision transformer neural network is further configured, for at least one set of embedded positional data, to embed a class token.

8. The method of claim 4, wherein spectrally un-mixing the spectral data comprises:

for each patch, generating a patch embedding;

inputting each patch embedding to a transformer encoder coupled to a multilayer perceptron head; and using the transformer encoder and the multilayer perceptron head to spectrally un-mix the spectral data associated with the set of patches.

9. The method of claim 8, wherein inputting each patch embedding to the transformer encoder comprises:

inputting each patch embedding to a multi-head attention layer; and for each patch embedding at the output of the multi-head attention layer, inputting the patch embedding to a multi-layer perceptron layer.

10. The method of claim 9, wherein inputting each patch embedding to the multi-head attention layer comprises:

normalizing the patch embedding; and inputting the normalized patch embedding to the multi-head attention layer.

11. The method of claim 9, wherein inputting the patch embedding to the multi-layer perceptron layer comprises:

normalizing the patch embedding; and inputting the normalized patch to the multi-layer perceptron layer.

12. The method of claim 2, wherein classifying the pixel associated with the one-dimensional spectrum comprises:

identifying, within the unmixed spectral data, one or more spectral signatures, each identified spectral signature corresponding to a respective spectral signature in a set of predefined spectral signatures associated with predefined materials; and classifying the pixel based on the one or more spectral signatures.

13. The method of claim 12, wherein classifying the pixel comprises:

identifying, based on the one or more spectral signatures, multiple materials associated with the pixel; and identifying, from among the multiple materials, one or more dominant materials.

14. The method of claim 13, wherein identifying the one or more dominant materials comprises:

applying one or more thresholds to each spectral signature associated with each of the multiple materials; and identifying the one or more dominant materials based on the application of the one or more thresholds.

15. The method of claim 13, wherein identifying the one or more dominant materials comprises:

for each of one or more other pixels of the array of pixels, determining at least one dominant material associated with the other pixel; and identifying the one or more dominant materials based on each determined dominant material of each other pixel.

16. A hyperspectral imaging system comprising:

a light source for emitting light;

a hyperspectral imaging sensor;

one or more computer processors; and a computer-readable medium storing computer program code configured, when executed by the one or more computer processors, to cause the one or more computer processors to perform a method comprising:

controlling the light source to illuminate an object;

receiving, from the hyperspectral imaging sensor, one or more hyperspectral images of the object captured in response to at least some of the emitted light being reflected by the object and being received at the hyperspectral imaging sensor, the one or more hyperspectral images comprising hyperspectral data, wherein the hyperspectral data comprises spectral data for each pixel in a two-dimensional array of pixels, and for each spectral band in a set of multiple spectral bands associated with each pixel;

converting the hyperspectral data into one-dimensional spectra, wherein each one-dimensional spectrum comprises, for a single pixel of the pixels, the spectral data for each spectral band in the set of multiple spectral bands associated with the single pixel;

inputting each one-dimensional spectrum to a trained transformer neural network; and for each one-dimensional spectrum, using the trained transformer neural network to spectrally un-mix the spectral data in the set of multiple spectral bands.

17. A non-transitory computer-readable medium storing computer program code configured, when executed by a processor, to cause the processor to:

receive hyperspectral data, wherein the hyperspectral data comprises spectral data for each pixel in a two-dimensional array of pixels, and for each spectral band in a set of multiple spectral bands associated with each pixel;

convert the hyperspectral data into one-dimensional spectra, wherein each one-dimensional spectrum comprises, for a single pixel of the pixels, the spectral data for each spectral band in the set of multiple spectral bands associated with the single pixel;

input each one-dimensional spectrum to a trained transformer neural network; and for each one-dimensional spectrum, use the trained transformer neural network to spectrally un-mix the spectral data in the set of multiple spectral bands.

* * * * *